Feb. 3, 1970 — H. L. DOBBINS — 3,493,924
VISUAL DISTRESS SIGNALING SYSTEM
Filed Feb. 17, 1966 — 3 Sheets-Sheet 1

INVENTOR.
HUGH L. DOBBINS
BY
Cushman, Darby, Cushman
ATTORNEYS

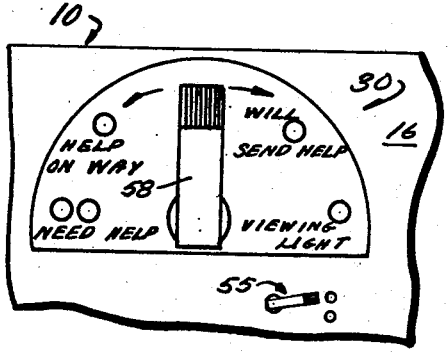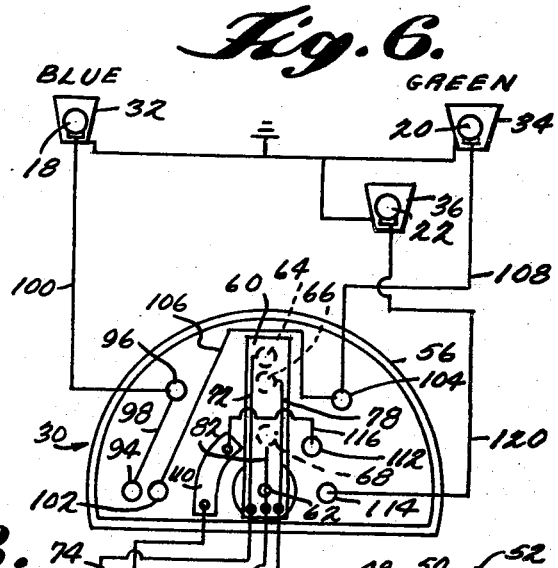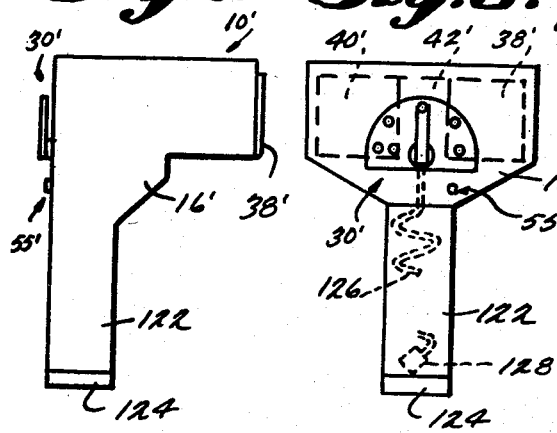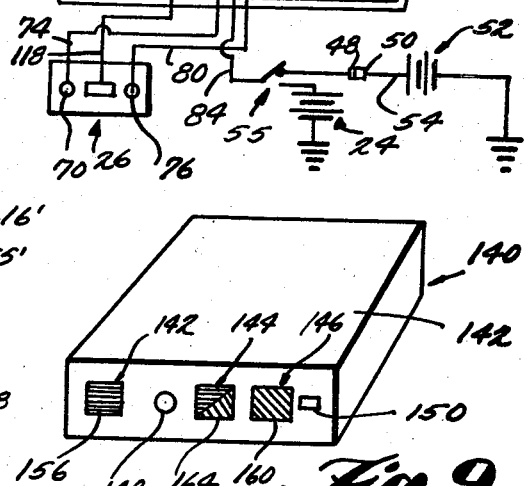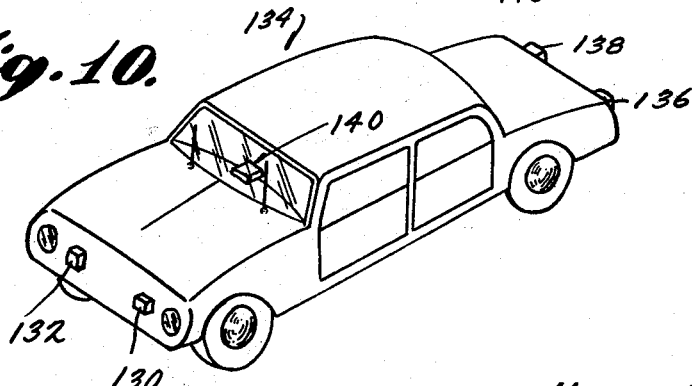

Feb. 3, 1970  H. L. DOBBINS  3,493,924
VISUAL DISTRESS SIGNALING SYSTEM
Filed Feb. 17, 1966  3 Sheets-Sheet 3

Fig. 11.

INVENTOR.
HUGH L. DOBBINS
BY
Cushman, Darby & Cushman
ATTORNEYS

United States Patent Office 3,493,924
Patented Feb. 3, 1970

3,493,924
VISUAL DISTRESS SIGNALING SYSTEM
Hugh L. Dobbins, 205 E. 10th St., Rome, Ga. 30161
Filed Feb. 17, 1966, Ser. No. 528,157
Int. Cl. B60q *1/00, 1/46;* E01f *9/00*
U.S. Cl. 340—54                                                2 Claims

ABSTRACT OF THE DISCLOSURE

A visual distress signaling system, especially for use in conjunction with automotive vehicles, includes two lamps of different colors and an operator-controlled circuit for flashing the lights alternately as a primary distress signal, for flashing only one of the lamps as an acknowledgement of another's primary distress signal and for flashing only the other lamp as a secondary distress signal for guiding a rescue vehicle to the site.

---

This invention relates to communication systems and in particular to signaling systems for producing visual emergency and recognition signals.

There is currently a need for a simple and economical visual distress system by means of which a person requiring help may clearly and positively indicate both his need and subsequently the fact that his distress signal has been acknowledged by another party. This combination of features prevents duplication of rescue efforts, because it permits the person needing help to guide a rescue party or the like to himself without simultaneously and continuously indicating his distressed condition. For example, it would be helpful if a person alone in a stalled automobile could send for assistance by signaling to a passing automobile, but it would not be desirable to signal each passing car because this would result in confusion if a multiplicity of persons reported the distress signal. At the same time it would be desirable for the stalled car to be readily identifiable to the rescue party, in this case, a tow truck. There is also a need for a system of this kind which is adapted to provide a will-send-help type of signal for acknowledging the distress signal being generated by separate but identical systems.

The present invention fulfills the first-mentioned need, broadly, by providing a signaling method device which produces, under the control of the operator or an automatic response system, a first visual signal indicating a need for assistance and a second and different visual signal indicating that assistance is still needed but that the original distress signal has been acknowledged by another party. The device also fulfills the second-mentioned need by providing a third visual signal which is employed as a recognition or acknowledgement signal which indicates to a distressed party that the person will send assistance. Thus, the device may be employed in pairs both as a distress signaler and as an acknowledgement signaler. It is contemplated, also, that the acknowledgement signal may be produced as an audio signal, as by the blowing of an automobile horn in three short blasts by a driver who sees a visual distress signal.

In a preferred form of the invention the signaling device is adapated to produce the first and second and inherently the third visual signals with two lights of different colors, for example, blue and green. The first, or primary distress signals may be produced by alternately flashing the blue and green lights. The second, or secondary distress signal used for guiding the rescue party may be produced by extinguishing the green light and flashing the blue light only. The third, or acknowledging signal may be produced by extinguishing the blue light and flashing the green light only. The flashing blue light may also be used by the rescue party to indicate that it is on an emergency mission.

The signaling device may be installed as a permanent part of a vehicle, such as an automobile, boat or airplane, or it may be a portable, self-powered unit. Preferably, when the device is incorporated into a motor vehicle, the signal lights are mounted on top of the vehicle so as to be visible from all directions, or they may be mounted in pairs on both the front and rear ends of the vehicle at about bumper height. In either case the switches for controlling the lights are conveniently mounted on the dashboard. In the portable unit the lights and switch arrangement are mounted in or on a single casing which is of a size to be carried manually. The portable unit may also be provided with a cord and suitable plug for use with the cigarette lighter socket of an automobile.

In one simple form the device is controlled manually by a suitable switch and circuit arrangement which is designed to permit flashing of both lights ("need help"), flashing of one of the lights alone ("will send help") and flashing of the other light alone ("help on the way") under the complete control of an operator. The scope of the invention includes, however, an automated system in which the generation of the initial distress signal, the assistance signal and the secondary distress signal are produced automatically. For example, the initial distress signal may be generated in response to the closing of a thermal switch or a mercury switch disposed to detect a fire in a motor vehicle or an upset. The assistance or will-send-help signal may be generated automatically upon the occurrence of the initial distress signal by incorporating in the device a detector which is responsive to the initial signal and which is designed to switch on either a visual or audio assistance signal when energized. Similarly, the production of secondary distress signal may be made responsive to the output of a detector for the assistance signal.

It is convenient to construct the signaling device by employing a conventional electric flasher unit for flashing the lights in the desired sequence. The principles of the system, however, do not require an electric flasher, and the invention contemplates that other means including mechanical means may be employed to produce intermittent visual signals.

The invention will be further understood from the following detailed description taken with the drawings in which:

FIGURE 5 is a fragmentary view, on an enlarged scale, looking in the direction of the arrows 5—5 of FIGURE 1;

FIGURE 6 is a schematic cross sectional view of the switch arrangement of FIGURE 5;

FIGURES 7 and 8 are schematic side and rear views, respectively, of modified form of a portable signaling unit;

FIGURE 9 is a schematic perspective view of a control box for a third form of signaling unit;

FIGURE 10 is a schematic perspective view of the control box of FIGURE 9 mounted in an automobile; and FIGURE 11 is a schematic cross sectional view of the control box of FIGURE 10.

Figure 1:
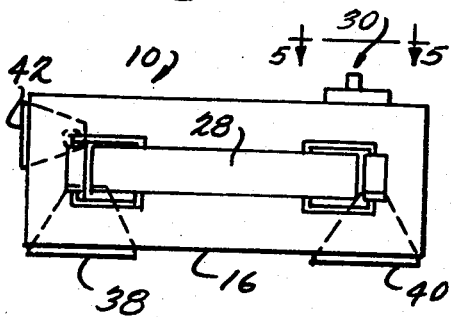
FIGURE 1 is a top plan view of a portable signaling and recognition unit.
Figure 2:
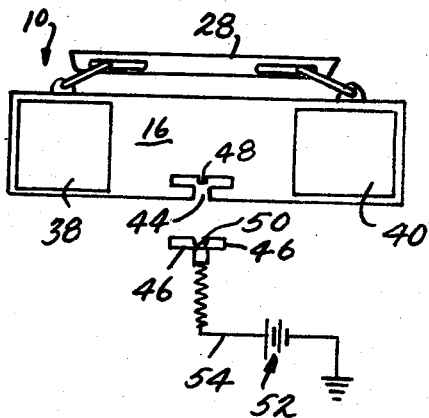
FIGURE 2 is a side elevational view of the unit in FIGURE 1.

Referring to FIGURES 1–4 there is shown a portable signaling and recognition unit 10 which is adapted to be carried in the hand or to be mounted in a fixed location. As shown, the unit 10 is mounted on top of the dashboard 12 of an automobile 14 in a position to be visible through the windshield 15. The unit 10 is a generally rectangular case 16 which contains three light bulbs 18, 20 and 22, a battery 24 and a conventional flasher unit 26 of the kind designed, when energized, to pass current to either of two circuits alternately. The electrical connections are omitted in FIGURES 1–4 in the interest of simplicity and are illustrated in FIGURE 6. The top surface of the exterior of the case 16 is provided with a carrying handle 28, and the exterior of the rear face is provided with a switch 30 for controlling the operation of the bulbs 18, 20 and 22. The bulbs 18 and 20, which constitute the signal lights of the unit 10, are disposed in spaced apart sockets 32 and 34 adjacent the front of the case. The bulb 22, which is for general utility, is disposed in any convenient location such as in a socket 36 adjacent one end of the case 16. Each of the sockets 32, 34 and 36 is associated with an aperture which is covered by a window 38, 40, 42 of plastic or glass. In the illustrated embodiment the windows 38 and 40 are blue and green, respectively. The window 42 is clear inasmuch as the bulb 22 is merely for illuminating purposes.

The case 16 may be attached to the dashboard 12 in any convenient manner. In the illustrated embodiment the lower surface of the case 16 is provided with a T-shaped slot 44 and a complementary bracket is secured to the dashboard 12 in a suitable manner, the bracket having a pair of arms 46 which frictionally engage the surfaces of the slot 44. Conveniently, the bracket and slot arrangement also serves as a means for effecting an electrical connection between the unit 10 and the electrical system of the automobile 14 so that the unit may be powered from the latter. This is illustrated schematically in FIGURE 2 wherein there is shown a contact 48 projecting from the interior of the case 16 into the slot 44 so as to be engaged by another contact 50 on the bracket. The contact 50 is insulated from the bracket and is connected to the automobile battery 52 by a wire 54. A switch 55 is provided on the case 16 for selecting the battery 52 or the battery 24 for operating the unit 10.

Figure 3:
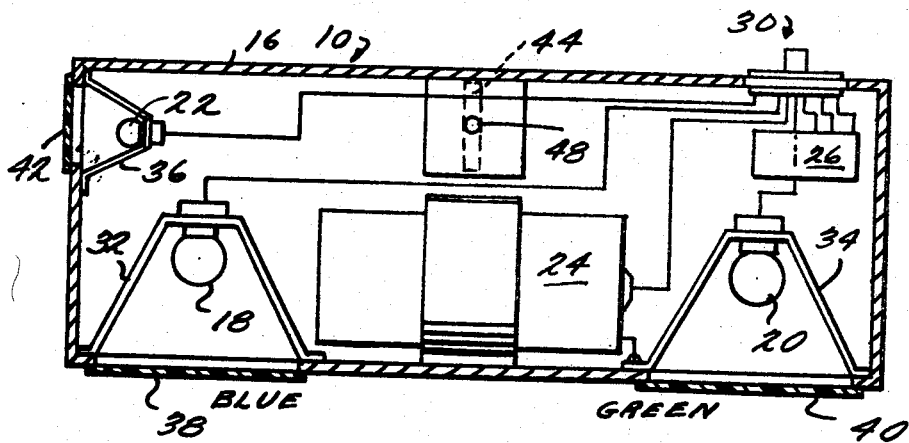
FIGURE 3 is a schematic sectional view taken generally on the line 3—3 of FIGURE 2.
Figure 4:
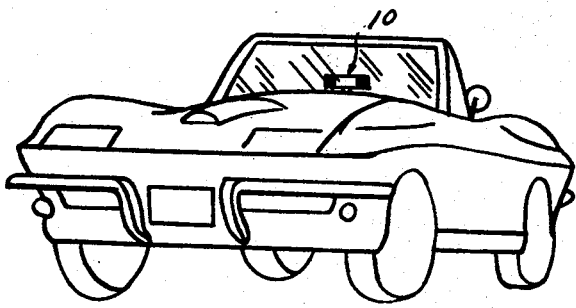
FIGURE 4 is a schematic perspective view illustrating the unit of FIGURE 1 mounted in an automobile.

FIGURES 3, 5 and 6 illustrate the internal circuitry of the unit 10 and the details of the control switch 30. The latter includes a switch box 56 secured to the case 16 and carrying a switch lever 58 which is manually rotatable 90° right and left from the upright position illustrated. The exterior surface of the box 56 is provided with appropriate marks for indicating the position of the lever. When the lever 58 is upright the unit 10 is off, and when the lever 58 is rotated 90° to the right only the viewing light 22 is illuminated. A "need help" signal, consisting of alternately flashing blue and green lights 18 and 20, is obtained when the lever 58 is turned 90° to the left. A "help on the way" signal, consisting of a flashing blue light 18, occurs at 45° of left rotation, and a "will send help" signal of flashing green light 20 occurs at 45° of right rotation.

As shown in FIGURE 6 the switch lever 58 includes an interior arm 60 which pivots with the lever 58 about an axis 62. The arm 60 is constructed of insulating material and is provided with three longitudinally spaced apart electrical contacts 64, 66 and 68. The outer contact 64 connects with one of the output terminals 70 of the flasher 26 through wires 72 and 74. The intermediate contact 66 connects with the other output terminal 76 of the flasher 26 by means of wires 78 and 80. The innermost contact 68 connects through wires 82 and 84 with the switch 55.

A plurality of fixed contacts is disposed in the switch box 56 in the path of the arm 60. A pair of contacts 94 and 96, interconnected by a wire 98 and lying in the path of contact 64, connects with the blue light 18 by means of a wire 100. Another pair of contacts 102 and 104, interconnected by a wire 106 and lying in the path of the contact 66, connects with the green light 20 by means of a wire 108. In the path of the movable contact 68 are three fixed contacts 110, 112 and 114 which serve to energize and de-energize the flasher and the viewing light 22. The contact 110 is elongated and arcuate in shape and is connected to the contact 112 by a wire 116 and to the flasher by a wire 118. The contact 114 connects with the viewing light 22 by means of a wire 120.

FIGURES 7 and 8 illustrate a second form of signaling unit which is similar to the unit 10 in that it is portable and adapted to be powered from either an internal or remote battery. The modified unit 10' includes a case 16' having a hollow cylindrical handle portion 122 which terminates in a conventional twist-off or hinged cap 124. The handle portion 122 stores an electrical cord 126 which is provided at one end with a fitting 128 adapted to be inserted into the cigarette lighter socket of an automobile. The other end of the cord 126 connects with a main control switch 30' through a switch 48', these switches being mounted on the rear of the case 16'. The front of the case is provided with a blue window 38', a green window 40' and a clear window 42', each being associated with a separate light bulb 18', 20', and 22'. The internal circuitry connecting the switches 30' and 48' and the bulbs 18', 20' and 22' is the same as illustrated in FIGURE 7.

FIGURES 9, 10 and 11 illustrate a non-portable signaling system in which the signal lights are remote from the switching arrangement. As shown, a pair of blue and green lights 130, 132 is mounted at the front of an automobile 134, and a similar pair 136, 138 at the rear. The switching arrangement, which comprises a push button console 140 is secured to the dashboard of the car in a location convenient to the driver.

The push button console 140 includes a flat box-like case 142 which carries three push buttons 142, 144 and 146 and two switches 148 and 150. In the interest of simplicity the mechanical mountings for the push buttons 142, 144 and 146 are omitted from the drawing, it being understood that a conventional mechanism is provided which latches a button in position when depressed and simultaneously releases the previously depressed button. As seen in FIGURE 11, each button includes a window and an indicator lamp which becomes illuminated and flashes when the repective button is depressed. As viewed from the front, the left-hand button 142 is provided with an indicator lamp 154 and a blue window 156, and the right-hand button 146 is provided with an indicator lamp 158 and a green window 160. The center button 144 is provided with an indicator lamp 162 and a window 164 which is divided diagonally into a blue and a green portion. Each lamp 154, 162 and 158 is associated with a fixed contact 166, 168, 170, respectively, which serves to energize the respective lamp when a button is depressed.

The switch 148 is of the push-pull type having an inner position shown in FIGURE 12 in full line and an outer position shown in dotted line. When the switch 148 is in the inner position and the button 144 is depressed, only the front pair of signal lights 130, 132 will be operative. When the switch 148 is in the outer position and the button 144 is depressed only the rear signal lights will be operative. Both pairs of signal lights will be operative when either the button 142 or the button 146 is depressed. As shown, the switch 148 includes a plunger 172 of non-conducting material and two spaced apart portions 174 and 176 of conducting material. Each conducting portion is associated with a group of three fixed contacts.

The front and rear blue lights 130 and 136 are connected to receive current from wires 178 and 180, respectively. The wire 178 terminates in a fixed contact 182 which is engaged by the switch portion 176 when the plunger 172 is in the full line position shown in FIGURE 11. The wire 178 also connects with a wire 181 which leads to a fixed contact 183 at push button 142. The wire 180 terminates in a fixed contact 184 which is engaged by the switch portion 176 when the plunger 172 is pulled out to the dotted-line position. An intermediate fixed contact 186 is disposed to remain in engagement with the switch portion 176 in either position of the plunger 172 and is connected to a wire 190 which leads to push button 144.

Each of the push buttons 142, 144 and 146 includes a non-conducting shank and one or more contact strips carried by the shank. The contact strips of buttons 142 and 146 are illustrated at 192 and 194, respectively. The button 144, which is shown in a depressed position, includes two spaced apart contact strips 196 and 198.

Referring again to the circuitry of the switch 148 and in particular to the circuitry for the blue lights 130 and 136, it will be seen that the wire 188 terminates in a fixed contact 200 adjacent the contact strip 192 of the blue button 142 and that the wire 190 terminates in a fixed contact 202 adjacent the contact strip 196 of the blue-green button 144. Current to the blue button 142 is supplied from one output terminal of a flasher 203 by means of a wire 204 and a fixed contact 206. Current to the blue portion of the blue-green button 144 is supplied from the same output terminal of the flasher 203 by means of a wire 208 and a contact 210.

The circuitry for the green lights 132 and 138 includes the portion 174 of the switch 148 and three fixed contacts 212, 214 and 216 engageable therewith. The center contact 214 remains in engagement with the portion 174 at all times, and contacts 212 and 216 engage the portion 174 only in the in and out positions, respectively, of the switch 148. Current is supplied to the green portion of the blue-green button 144 from the flasher 203 by means of a wire 218 which ends in a contact 220. Current to the green button 146 flows from the same flasher output through a wire 222 which ends in a contact 224. Current for illuminating the green bulbs 132 and 138 flows from the blue-green button 144 through a contact 226 and a wire 228. Current from the green button 146 flows through either a contact 230 and a wire 232 or a contact 229 and a wire 235, the latter connecting with the contact 212. Electrical connection to the green light 132 is completed by means of the contact 212 and a wire 231. Electrical connection to the green light 138 is completed by means of the contact 216 and a wire 233.

Power is supplied to the console 140 from a battery 234 carried within the case 142 or from a battery 236 forming part of the electrical system of the automobile 134. The switch 150 includes a switch arm which is pivotable into contact with either of two contacts 238 and 240, the former being connected to the internal battery 234 and the latter being connected to the auto battery 236. In an upright position the switch arm engages neither contact 238 nor contact 240. Current from the switch arm passes to the input terminal of the flasher 203 through a wire 242.

There is also provided an impact switch 250 which will activate the signal lamps in the event of a collision or upset. The switch may be incorporated within the console 140 or it may be remote, and in the interest of simplicity it is illustrated in vertical section. As shown, the switch includes two movable contact plates 252 which are spring biased toward two pairs of fixed contacts 254 and 256. In their normal position the plates 252 are held away from the fixed contacts by a metal ball 258 or the like which rests on a seat 260. The ball 258 normally depresses a pin 262 which is attached to the plates 252 at its lower end, but when the ball 258 becomes unseated by a collision or upset the pin and the plates will move upwardly.

The operation of the unit 10 of FIGURES 1–6 is as follows, assuming that the switch 30 is initially in an off position. When an emergency occurs and the operator wishes to signal for assistance he may secure the case 16 to the dashboard of the automobile 14 so as to effect engagement of the bracket contact 50 with the case contact 48 or he may employ the unit 10 separately from the automobile in the event that the unit 10 is not readily visible to a passerby. If the case 16 has been secured to the dashboard 12 he may use the automobile battery as the power source by pushing the switch 55 to an up position, or he may use the internal battery 24 by pushing the switch 55 to a down position.

When the operator desires to indicate his need for assistance he turns the switch lever 58 a quarter turn to the left as viewed in FIGURE 5. This moves the arm 60 a quarter turn in which position the contact 64 engages the fixed contact 94, the contact 66 engages the fixed contact 102 and the contact 68 engages the fixed contact 110. Current flowing from the switch 55 passes through the wires 84 and 82 to the contact 68 and then to the fixed contact 110 to the input of the flasher 26 through the wire 118. The blue light 18 will then flash off and on as current flows to it from the flasher 26 through wires 74 and 72, contacts 64 and 94 and wires 98 and 100. The green light also flashes off and on as current flows to it from the flasher 26 through wires 80 and 78, contacts 66 and 102 and wires 106 and 108.

When a passerby sees the distress signal of flashing blue and green lights and wishes to indicate to the distressed person that he will send help, he will acknowledge the distress signal with a flashing green light, assuming for purposes of illustration that his automobile is equipped with a signaling unit identical with the unit. 10. This acknowledging, or will-send-help signal, is generated by turning the switch lever 58 one eighth turn to the right of center so as to engage the contact 66 with the fixed contact 104 and the contact 68 with the fixed contact 112. In this position of the arm 60 the current will flow to the flasher 26 through the wires 84 and 82, the contacts 68 and 112 and the wires 116 and 118. Current to the green light 20 will take the same path as described with respect to the distress signal, except that the fixed contact 102 and the wire 106 do not form part of the circuit.

When the distressed person sees the acknowledging or will-send-help signal he switches his signaling unit 10 to generate a flashing blue light so as to identify himself to the emergency vehicle and so as to indicate to passerby that his initial distress signal has been acknowledged. This is accomplished by turning the switch lever 58 from the far right position to a position one eighth turn to the left of center. The arm 60 thereby places the contact 64 in engagement with the fixed contact 96 and the contact 68 in engagement with the fixed contact 110. Current will flow to the flasher 26 through the wires 84 and 82, the contacts 66 and 112, and the wires 116 and 118. In this position of the arm 60 the flow of current from the flasher 26 to the blue light 18 is the same as previously described. No current flows to the green light 20 because the contact 66 does not engage any fixed contacts within the switch box 56.

When it is desired to employ the signaling unit 10 as a viewing light it will generally be convenient to remove the unit 10 from the dashboard 12 and to employ the internal battery 24 by pushing the switch 55 to a down position. When the switch lever 58 is rotated a quarter turn to the right center the only contacts which will engage are contacts 68 and 114. Current will flow to contact 68 in the path described previously and will then flow to the light 22 through the fixed contact 114 and the wire 120.

The operation of the unit 10′ of FIGURES 8 and 9 is analogous to that of the unit 10. The switches 30′ and 55′ are identical to their counterparts described above. The unit 10′ is intended to be held in the hand by the handle 122 when in use and may be powered by its internal battery (not shown) or by plugging it into the cigarette lighter socket of a vehicle by means of the plug 128 and cord 126.

The signaling system of FIGURES 9, 10 and 11 is employed to generate the same blue and green signals as the portable units 10 and 10' previously described. The system is not a hand portable system, however, and therefore it does not include a white viewing light. In the position of the elements illustrated in FIGURE 12 the switch 150 is in its left-hand position thereby powering the console 140 with the internal battery 234. Movement of the switch 150 to its full right-hand position will power the console 140 with the vehicle battery 236 and movement of the switch 150 to a center position will deactivate the console 140.

The center or blue-green push button 144 has been depressed in FIGURE 11 and is latched in a depressed position by means of a mechanical arrangement (not shown) of the type conventionally employed with push button controls. This results in flashing of the front blue and green lights 130 and 132, respectively, as current flows from the battery 234 through the circuit effected by the flasher 203, the push button 144 and the switch 148. Specifically, current passes to the input of the flasher 203 through the wire 242 and from both the blue and green outputs of the flasher through wires 204 and 222. Since the movable contact strips 196 and 198 have been engaged with their adjacent contacts, current flows into the wires 190 and 228 and to the indicator lamp 162. Current in the wire 190 flows through the switch portion 176, fixed contact 182 and wire 178 to the front blue light 130. Current in the wire 228 flows through the switch portion 174 and the wire 231 to the front green light 132.

If it is desired to flash the rear blue and green lights 136 and 138 in preference to the front lights, the switch 148 is pulled out to the dotted line position shown in FIGURE 12. This disengages the switch portion 176 from the fixed contact 182 and at the same time engages the portion 176 with the fixed contact 184 so as to energize the wire 180 and the rear blue light 136. Simultaneously the switch portion 174 disengages from the fixed contact 212 and engages the fixed contact 216 thereby energizing the wire 233 and the rear green light 138.

When the operator desires to produce a green acknowledging signal he depresses green push button 146. This engages the contact strip 194 with its contacts 170, 230, 224 and 229, thereby energizing the indicator lamp 158 and the wires 232 and 235. Current flows through the wire 232 to the wire 233 and thence to the rear green light 138, irrespective of the position of the switch 148. Current to the front green light 132 flows in the path defined by the contact 229, wire 235, contact 212 and wire 231. At the same time the previously depressed push button is released by the push button mechanism (not shown) and returns to its out position.

Similarly, a blue help-on-the-way signal is produced by depressing the blue push button 142 to engage the contact strip 192 with contacts 166, 183, 200 and 206. This permits flow of current from the wire 204 to the wires 181 and 178 and to the wires 188 and 180 without regard to the position of the switch 148.

The operation of the impact switch 250 is readily apparent. If the ball 258 becomes unseated the spring pushes the contact plates 252 into engagement with the fixed contacts 254. The resulting electrical connection between the left pair of contacts 254 allows current to flow from the flasher output wire 218, through the contacts to both wires 231 and 233. The electrical connection between the right pair of contacts 254 allows current to flow from the flasher output wire 204, through the contacts to both wires 181 and 188.

The embodiments have been described by way of illustration.

What is claimed is:
1. In combination with a self-powered vehicle:
   lamp means for producing first and second visual signals of different colors, said lamp means being disposed so that said signals are visible from front and rear of said vehicle and being operable in a first mode in which the signals are visible only from the front of said vehicle and in a second mode in which the signals are visible only from the rear of said vehicle;
   electrical circuit means for supplying current to said lamp means;
   means forming part of said circuit means including a selector switch for deactivating said lamp means in either of said modes of operation;
   means forming part of said circuit means including a first signaling switch for activating said lamp means to alternately flash the different colored signals in whichever operating mode has been selected by said selector switch;
   means forming part of said circuit means including a second signaling switch for overriding said selector switch and for flashing only one of said colored signals in both said modes; and
   means forming part of said circuit means including a third signaling switch for overriding said selector switch and for flashing only the other of said colored signals in both said modes.
2. Apparatus as in claim 1 including an impact switch forming part of said circuit means for overriding said selector switch and for alternately flashing the different colored signals in both said modes.

References Cited

UNITED STATES PATENTS

| | | | |
|---|---|---|---|
| 2,035,841 | 3/1936 | Signor | 340—331 |
| 2,559,163 | 7/1951 | MacDonald | 350—87 |
| 2,635,227 | 4/1953 | Liotta | 340—22 |
| 2,667,602 | 1/1954 | Flemming | 340—55 X |
| 2,706,806 | 4/1955 | Johnson. | |
| 2,706,808 | 4/1955 | Hollins | 340—83 X |
| 2,878,462 | 3/1959 | Tralli | 340—80 X |
| 3,375,496 | 3/1968 | Antunovic | 340—81 X |

FOREIGN PATENTS

| | | |
|---|---|---|
| 612,533 | 8/1926 | France. |
| 703,499 | 2/1931 | France. |
| 858,494 | 5/1940 | France. |
| 1,734 | 1897 | Great Britain. |
| 300,013 | 11/1928 | Great Britain. |

JOHN W. CALDWELL, Primary Examiner

KENNETH N. LEIMER, Assistant Examiner

U.S. Cl. X.R.

340—61, 66, 83, 97, 119, 321